United States Patent
Niwano (10) Patent No.: US 9,140,934 B2
(45) Date of Patent: Sep. 22, 2015

(54) LIQUID CRYSTAL DISPLAY

(71) Applicant: MITSUBISHI ELECTRIC CORPORATION, Tokyo (JP)

(72) Inventor: Yasunori Niwano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 118 days.

(21) Appl. No.: 13/892,998

(22) Filed: May 13, 2013

(65) Prior Publication Data

US 2013/0308084 A1   Nov. 21, 2013

(30) Foreign Application Priority Data

May 15, 2012  (JP) .................................. 2012-111607

(51) Int. Cl.
*G02F 1/1339*  (2006.01)

(52) U.S. Cl.
CPC .......... *G02F 1/1339* (2013.01); *G02F 1/13394* (2013.01); *G02F 2001/13396* (2013.01)

(58) Field of Classification Search
None
See application file for complete search history.

(56) References Cited

U.S. PATENT DOCUMENTS

| 6,870,593 | B2 | 3/2005 | Satoh | |
|---|---|---|---|---|
| 2006/0055863 | A1* | 3/2006 | Sawasaki et al. | 349/156 |
| 2009/0153785 | A1* | 6/2009 | Iwato et al. | 349/106 |
| 2013/0050619 | A1* | 2/2013 | Kim et al. | 349/106 |

FOREIGN PATENT DOCUMENTS

JP    2003-084289 A    3/2003

* cited by examiner

*Primary Examiner* — Richard Kim
(74) *Attorney, Agent, or Firm* — Studebaker & Brackett PC

(57) ABSTRACT

A liquid crystal display includes a liquid crystal display panel. The liquid crystal display panel includes a substrate and a substrate which are disposed opposite to each other, columnar spacers which are disposed on a surface of the substrate, and a liquid crystal layer filled between the substrates. A peripheral edge part of a display region has a dual PS structure in which the columnar spacer and the columnar spacer are disposed. A central part of the display region has any of a main PS structure in which only the columnar spacer is disposed, a sub PS structure in which only the columnar spacer is disposed, and the dual PS structure.

4 Claims, 6 Drawing Sheets

(a) CENTRAL PART (b) PERIPHERAL EDGE PART

LIQUID CRYSTAL DISPLAY

BACKGROUND OF THE INVENTION

1. Field of the Invention

The present invention relates to a liquid crystal display for suppressing a change in a gap by utilizing a columnar spacer.

2. Description of the Background Art

A liquid crystal display includes a liquid crystal display panel and a driving circuit. The driving circuit supplies a predetermined signal or voltage to the liquid crystal display panel. The liquid crystal display panel generally has a pair of substrates and a liquid crystal layer disposed between the pair of substrates. The pair of substrates has an active matrix substrate and a color filter substrate, for example. Moreover, the pair of substrates is disposed to be opposed to each other. In addition, a liquid crystal display of a transmission type or a semitransmission type has an illuminating device such as a back light.

A thickness of the liquid crystal layer of the liquid crystal display panel is defined by a member which is referred to as a spacer. For the spacer, there is used a columnar spacer formed by using a photosensitive resin in a substrate.

In order to obtain high display quality, it is important to set and maintain the thickness of the liquid crystal layer to have a predetermined value. For this reason, optimization of a structure and arrangement of the columnar spacer is an important technical problem.

First of all, a characteristic for easily carrying out deformation with respect to a very small load is required for the columnar spacer. The reason is as follows. For example, in the case in which the liquid crystal display is put in a low temperature, all members constituting the liquid crystal display try to contract. In this case, a contraction rate of a liquid crystal material in the members constituting the liquid crystal display is the highest. For this reason, the gap contracts in such a direction that a gap between transparent substrates is reduced.

At this time, if the deformation of the columnar spacer cannot follow the reduction in the gap, a pressure in a liquid crystal cell of the liquid crystal display is lowered. As a result, vacuum air bubbles (low temperature foaming) in a liquid crystal cell tends to be generated.

To the contrary, in the case in which the liquid crystal display is put in a high temperature, all of the members constituting the liquid crystal display tend to expand. Also in this case, the liquid crystal material has the highest expansion rate in the members constituting the liquid crystal display. For this reason, the pressure in the liquid crystal cell is raised.

Referring to the columnar spacer, the columnar spacer is usually provided with being compressed in advance when the liquid crystal display panel is to be fabricated in order to also follow a change in the gap in an extending direction. Within a range in a certain extent, therefore, the change in the gap caused by thermal expansion of a liquid crystal can be absorbed by extension through elastic deformation of the columnar spacer.

In the same manner as in the case in which the liquid crystal display is put in a low temperature, however, if the change in the gap is excessively great, the deformation of the columnar spacer cannot follow the enlargement of the gap so that a clearance is formed between the columnar spacer and one of the transparent substrates. In other words, a gap between the transparent substrates is not held by the columnar spacer. As a result, a liquid crystal corresponding to a volume which is not held by the columnar spacer flows downward by a dead weight so that the liquid crystal is accumulated on a lower part in the liquid crystal cell. Consequently, a gap on a lower side of the liquid crystal display panel is enlarged locally so that an unevenness on a display (a gravity irregularity) is caused.

From the foregoing, it is desirable that the columnar spacer should have such a characteristic as to follow the change in the gap between the transparent substrates within a range which is as wide as possible. More specifically, it is desirable that the columnar spacer should be easily compressed and deformed against a very small load with respect to a change in such a direction that a predetermined gap is reduced, and furthermore, the columnar spacer compressed in the predetermined gap is greatly extended and deformed with respect to a change in such a direction that the gap is enlarged.

On the other hand, the columnar spacer is required to have a plastic deformation amount reduced after strong force is applied and then removed. The reason is as follows. In the case in which comparatively great weighting is locally applied to the liquid crystal display panel so that the deformation amount of the columnar spacer exceeds an elastic deformation range, a gap in a weighting application portion is maintained to be crushed and narrowed. In the case in which the plastic deformation amount, that is, a disposition after the removal of the force is large, a gap irregularity occurs.

As the case in which the comparatively great weighting is locally applied to the liquid crystal display panel, a pressure test such as a finger push test in manufacture or the like is taken as an example. Moreover, in the case of a liquid crystal display panel including a touch panel, it is also assumed that pushing is unnecessarily carried out in use and great weighting is consequently applied. In any case, the weighting is often applied to a central part of a video display region in the liquid crystal display panel. Furthermore, as compared with a peripheral edge part of the display region to which a seal for bonding transparent substrates together to seal a liquid crystal or the like is close, the weighing directly acts on the columnar spacer so that the columnar spacer is deformed in the central part.

Moreover, by a method of dropping a liquid crystal material onto substrate surfaces and then bonding substrates together (which will be hereinafter referred to as an instillation method) that is recently employed widely, a thickness of a liquid crystal layer (a cell gap) is determined depending on a drip of the liquid crystal material. For this reason, there is a problem in that a gap irregularity tends to occur when a balance is lost between the height of the columnar spacer and the drip of the liquid crystal.

As their countermeasure, Japanese Patent Application Laid-Open No. 2003-084289 discloses the technique having the structure in which two types of columnar spacers having different heights are provided and an external load within an elastic deformation range of the higher one of the columnar spacers is applied to the lower columnar spacer (which will be hereinafter referred to as the related art A). According to the related art A, it is possible to absorb the contraction of the cell gap with a change in a temperature by only the higher spacer, thereby reducing an occurrence of low temperature foaming/gravity irregularity. Moreover, when a pressure is applied, it is possible to suppress the occurrence of the gap irregularity by the action of the lower spacer.

However, the related art A has the following problem. In the related art A, it is possible to suppress a change in a gap at a high temperature or a low temperature. However, with the structure according to the related art A, a strength is not generally sufficient in the central part of the video display region to which a pressure is applied more easily than the peripheral edge part of the display region of the image.

SUMMARY OF THE INVENTION

It is an object of the present invention to provide a liquid crystal display capable of suppressing a change in a gap of a peripheral edge part of a display region while maintaining a strength of a central part in the display region.

A liquid crystal display according to an aspect of the present invention includes a liquid crystal display panel for displaying a video, the liquid crystal display panel includes a first substrate and a second substrate which are disposed opposite to each other, a plurality of columnar spacers disposed on a surface of the first substrate and providing a gap between the first substrate and the second substrate, and a liquid crystal layer filled between the first substrate and the second substrate, the plurality of columnar spacers includes at least one first columnar spacer and at least one second columnar spacer, a height of the first columnar spacer in a non-pressure state in which a pressure is not received in a vertical direction is greater than that of the second columnar spacer in the non-pressure state, a peripheral edge part of a display region has a dual PS structure in which the first columnar spacer and the second columnar spacer are disposed, a central part of the display region has any of a main PS structure in which only the first columnar spacer is disposed, a sub PS structure in which only the second columnar spacer is disposed, and the dual PS structure, and in the case in which the central part has the dual PS structure and a variation in a height between the first columnar spacer in the non-pressure state and the first columnar spacer compressed upon receipt of a pressure in a vertical direction is represented by $\Delta PS$, there is satisfied a relational expression of $\Delta PS$ of the first columnar spacer in the central part $< \Delta PS$ of the first columnar spacer in the peripheral edge part.

Each of the main PS structure and the sub PS structure includes only the columnar spacer having the same height in the non-pressure state. Therefore, according to the present invention, in the case in which the central part has the main PS structure or the sub PS structure, the central part has a sufficient strength.

Moreover, according to the present invention, in the case in which the central part has the dual PS structure, $\Delta PS$ of the first columnar spacer in the central part is smaller than $\Delta PS$ of the first columnar spacer in the peripheral edge part. In other words, the first columnar spacer in the central part is deformed against a pressure with more difficulty than the first columnar spacer in the peripheral edge part. For this reason, the central part of the display region has a more sufficient strength than the peripheral edge part.

The dual PS structure has a function for suppressing a change in a gap due to the expansion of the liquid crystal layer at a high temperature or the contraction of the liquid crystal layer at a low temperature. According to the present invention, the peripheral edge part has the dual PS structure. Accordingly, it is possible to suppress a change in the gap in the peripheral edge part.

From the foregoing, it is possible to suppress the change in the gap of the peripheral edge part in the display region while maintaining the strength of the central part in the display region.

These and other objects, features, aspects and advantages of the present invention will become more apparent from the following detailed description of the present invention when taken in conjunction with the accompanying drawings.

DESCRIPTION OF THE PREFERRED EMBODIMENTS

Preferred embodiments according to the present invention will be described below with reference to the drawings. In the following description, the same components have the same reference numerals. Their names and functions are also the same. Accordingly, their detailed description will be omitted in some cases.

Dimensions, materials, shapes, relative arrangement and the like of respective components illustrated in the preferred embodiments are properly changed depending on a structure of a device to which the present invention is applied or various conditions, and the present invention is not restricted to their illustration. Moreover, the dimensions of the respective components in the drawings are different from actual dimensions in some cases.

First Preferred Embodiment

Figure 1:
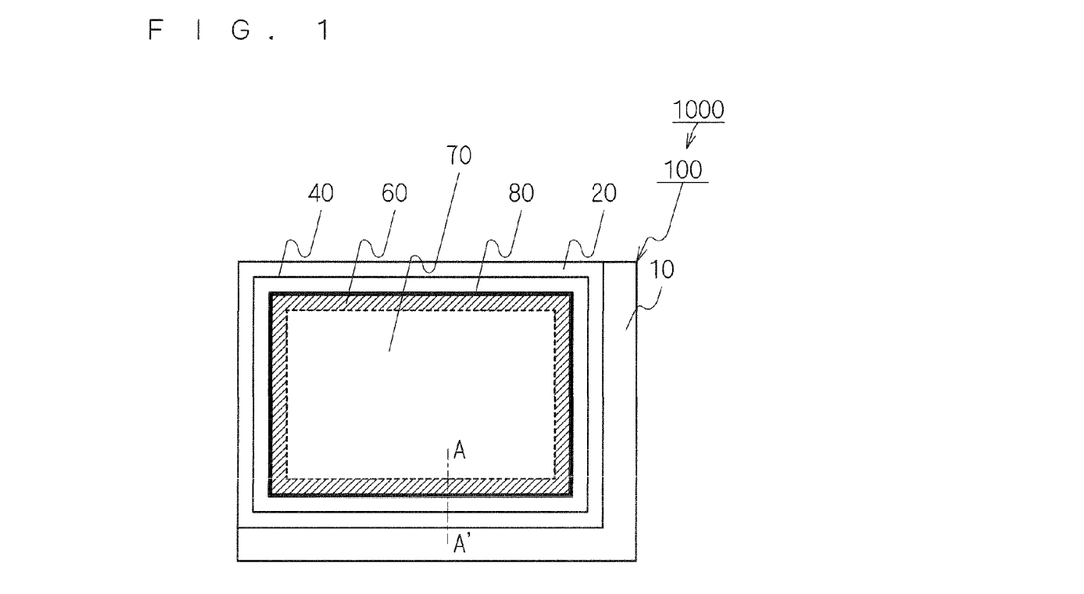
FIG. 1 is a plan view showing a liquid crystal display according to a first preferred embodiment.
Figure 2:
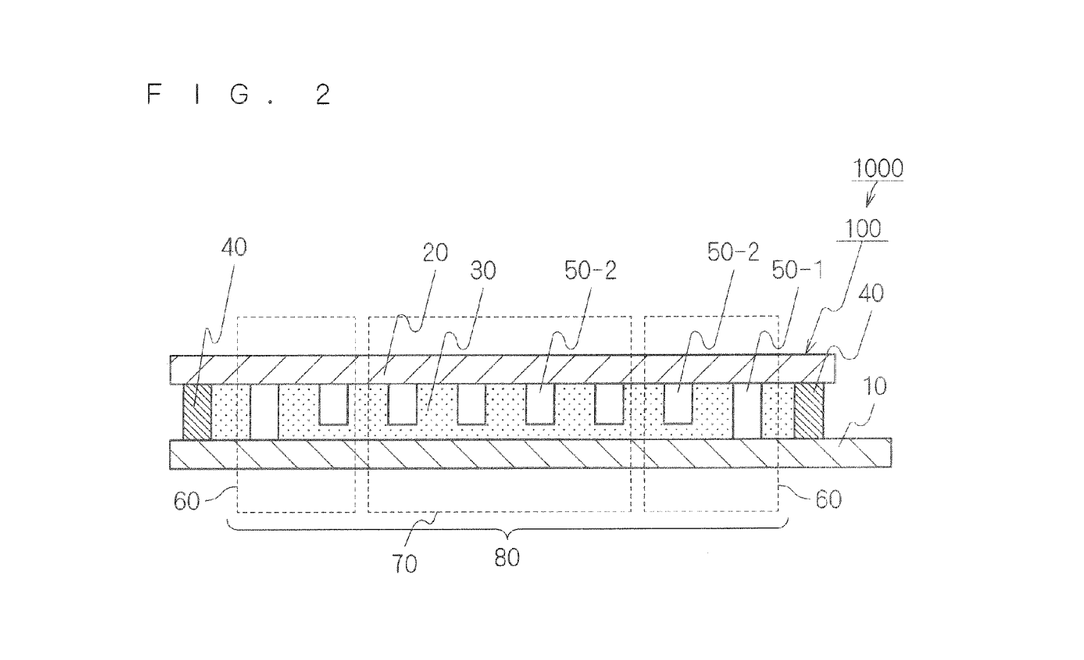
FIG. 2 is a sectional view showing the liquid crystal display according to the first preferred embodiment.

FIG. 1 is a plan view showing a liquid crystal display 1000 according to a first preferred embodiment. FIG. 2 is a sectional view showing the liquid crystal display 1000 according to the first preferred embodiment. More specifically, FIG. 2 is a sectional view showing the liquid crystal display 1000 taken along an A-A' line in FIG. 1.

With reference to FIGS. 1 and 2, the liquid crystal display 1000 includes a liquid crystal display panel 100 for displaying a video. The liquid crystal display 1000 includes a driving circuit, a wiring and the like which are not shown. The driving circuit serves to drive the liquid crystal display panel 100.

The liquid crystal display panel 100 includes a substrate 10 and a substrate 20, a plurality of columnar spacers 50-1 and 50-2, a liquid crystal layer 30, and a sealing material 40.

The substrates 10 and 20 are disposed opposite to each other. The substrate 10 is a TFT substrate provided with a TFT (Thin Film Transistor). The substrate 20 is a color filter substrate which is provided with a color filter.

The substrates 20 and 10 are provided with a display region 80 which is parallel with a surface of the substrate 20. The display region 80 serves to display a video thereon. The display region 80 in FIG. 1 is constituted by a plurality of pixels (not shown) which is arranged in a matrix.

The display region 80 includes a central part 70 and a peripheral edge part 60. The central part 70 is positioned in a central portion (region) of the display region 80. The peripheral edge part 60 is a portion which is provided in the display region 80 and is positioned on a peripheral edge of the display region 80.

The liquid crystal layer 30 is filled between the substrate 20 and the substrate 10. More specifically, the liquid crystal layer 30 is filled in a region which is enclosed by the substrate 10 and the substrate 20, and the sealing material 40. The region in which the liquid crystal layer 30 is filled is constituted by the sealing material 40, the peripheral edge part 60 and the central part 70.

The columnar spacers 50-1 and 50-2 having elasticity are disposed on the surface of the substrate 20. The surface of the substrate 20 is opposed to the substrate 10. In the following, each of the columnar spacers 50-1 and 50-2 will be referred to as a columnar spacer 50. In other words, the liquid crystal display panel 100 includes a plurality of columnar spacers 50. Each of the columnar spacers 50 is constituted by an acrylic transparent photosensitive resin, for example.

Moreover, a state in which a pressure is not applied in a vertical direction of the columnar spacer 50 will be hereinafter referred to as a non-pressure state. The height of the columnar spacer 50-1 in the non-pressure state is greater than that of the columnar spacer 50-2 in the non-pressure state.

At least one of the columnar spacers 50 included in the liquid crystal display panel 100 abuts on the substrate 10 so as to provide a gap between the substrates 20 and 10. In other words, the columnar spacers 50 included in the liquid crystal display panel 100 provides the gap between the substrates 20 and 10. More specifically, the columnar spacer 50-1 abuts on the substrate 10 so as to provide the gap between the substrates 20 and 10. Accordingly, a space (a gap) between the substrates 20 and 10 is defined by the columnar spacer 50. In the following, the gap will be referred to as a panel gap.

In each of the drawings in this specification, a height of each columnar spacer is shown with increase in such a manner that a difference between the heights of the respective columnar spacers can be known clearly. For this reason, a ratio of heights and diameters of the columnar spacers in the respective drawings of the specification is not accurate.

In the following, a range in which a member having elasticity is not subjected to plastic deformation by an external pressure and is elastically deformable by the external pressure will also be referred to as an elastic deformation range. Moreover, in the following, a limit value (a maximum value) of the elastic deformation within the elastic deformation range of the member having elasticity will also be referred to as a maximum deformation amount.

The difference between the heights of the columnar spacers 50-1 and 50-2 is set to cause the columnar spacer 50-2 to contribute to hold the gap between the substrates 10 and 20 within the elastic deformation range of the columnar spacer 50-1. For example, the heights of the columnar spacers 50-1 and 50-2 are set in such a manner that the difference between the heights of the columnar spacers 50-1 and 50-2 has a smaller value than the maximum deformation amount of the columnar spacer 50-1.

Actually, a characteristic of elasticity is varied depending on the height, sectional area, constituent material and the like of the columnar spacer 50-1. For this reason, it is assumed that the columnar spacer 50-1 takes a cylindrical shape having a diameter of approximately 20 μm and a height of approximately 4 μm and the columnar spacer 50-1 is constituted by a transparent photosensitive resin as a standard, for instance. In this case, the difference between the heights of the columnar spacers 50-1 and 50-2 is set to be almost less than ten percent of the height of the columnar spacer 50-1, for instance. More specifically, the difference between the heights of the columnar spacers 50-1 and 50-2 is set to be almost less than 0.4 μm.

Figure 3:
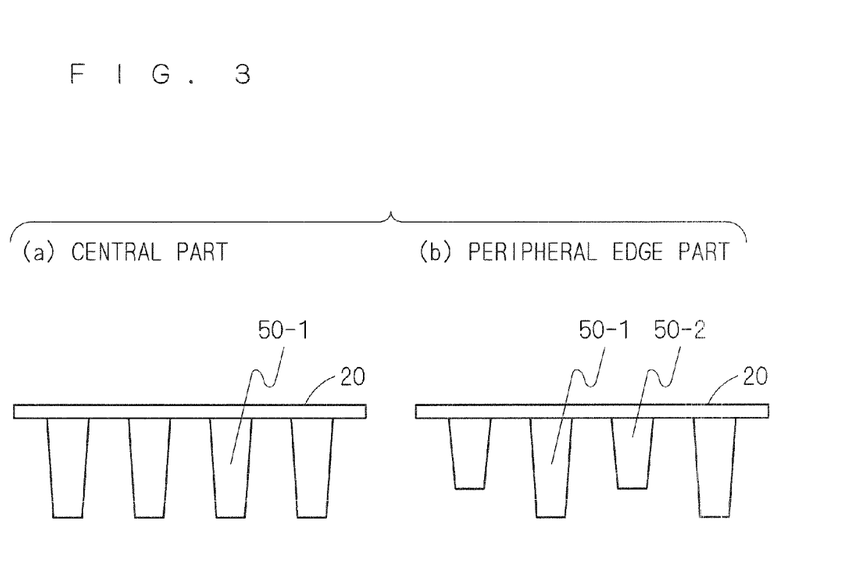
FIG. 3 is a sectional view showing each columnar spacer before two substrates are disposed opposite to each other according to the first preferred embodiment.

FIG. 3 is a sectional view showing each columnar spacer before the substrate 20 is disposed opposite to the substrate 10 according to the first preferred embodiment. In other words, FIG. 3 is a sectional views showing each columnar spacer in the middle of manufacture of the liquid crystal display panel 100. Part (a) in FIG. 3 is a sectional view showing each columnar spacer in the central part 70. Part (b) in FIG. 3 is a sectional view showing each columnar spacer in the peripheral edge part 60.

In the liquid crystal display panel 100 according to the present preferred embodiment, only the columnar spacer 50-1 of the columnar spacers 50-1 and 50-2 is disposed in the central part 70 of the display region 80. In other words, the central part 70 of the display region 80 has a structure in which only the columnar spacer 50-1 is disposed in the central part 70. In the following, the structure in which only the columnar spacer 50-1 of the columnar spacers 50-1 and 50-2 is disposed will also be referred to as a main PS structure.

Moreover, the peripheral edge part 60 of the display region 80 has a structure in which the columnar spacer 50-1 and the columnar spacer 50-2 are disposed in the peripheral edge part 60. In the following, the structure in which two types of columnar spacers having different heights are disposed in a non-pressure state will also be referred to as a dual PS structure. Accordingly, the peripheral edge part 60 in which the columnar spacers 50-1 and 50-2 are disposed has the dual PS structure.

By the structure described above, a difference between the height of the highest columnar spacer in the non-pressure state and that of the lowest columnar spacer in the non-pressure state is greater in the peripheral edge part 60 than the central part 70. In the following, the difference between the height of the highest columnar spacer in the non-pressure state and that of the lowest columnar spacer in the non-pressure state will also be referred to as a concavo-convex difference in the columnar spacer.

In other words, in the present preferred embodiment, the difference (the concavo-convex difference in the columnar spacer) between the height of the columnar spacer 50-1 in the non-pressure state and that of the columnar spacer 50-2 in the non-pressure state is greater in the peripheral edge part 60 than the central part 70. In other words, the difference between the height of the columnar spacer 50-1 in the non-pressure state and that of the columnar spacer 50-2 in the non-pressure state in the peripheral edge part 60 is greater than the difference between the height of the columnar spacer 50-1 in the non-pressure state and that of the columnar spacer 50-2 in the non-pressure state in the central part 70. In the present preferred embodiment, only the columnar spacer 50-1 is disposed in the central part 70. For this reason, the concavo-convex difference in the columnar spacer of the central part 70 is zero.

The columnar spacers 50-1 and 50-2 are formed at a single exposing step through a change in a transmittance of a photomask, for example. At the exposing step, there is used a negative resist having a solubility to a developing solution reduced when it is exposed.

More specifically, at the single exposing step, the transmittance of the photomask is varied to be 100% and 50%, for instance. Consequently, it is possible to form a region which is exposed at 100% and is left without development and a region which is exposed and is then developed, and has a film thickness reduced.

For regulating the transmittance of the photomask, there is used a half tone method of carrying out middle exposure by utilizing a semitransparent film, a gray tone method of forming a slit having a resolution which is equal to or lower than that of an exposing machine, thereby shielding light to carry out middle exposure, or the like. Even though any of the methods is utilized, it is possible to form columnar spacers having different heights at the same time through single exposing and developing steps if the photomask can be prepared. Therefore, a manufacturing cost can be prevented from being increased considerably.

In the following, a rate of a total sum of an area in which each columnar spacer 50 is provided in contact with the substrate 20 in a unit area to the unit area in the display region 80 will also be referred to as a disposition density. The unit area indicates an area of one pixel, for instance.

In the present preferred embodiment, there is employed a structure in which the disposition density of the columnar spacer 50 in the peripheral edge part 60 is almost equal to that of the columnar spacer 50 in the central part 70. The plurality of columnar spacers 50 in the peripheral edge part 60 are constituted by the plurality of columnar spacers 50-1 and 50-2. Accordingly, a disposition density of the columnar spacer 50-1 in the peripheral edge part 60 is lower than that of the columnar spacer 50-1 in the central part 70. For instance, the disposition density of the columnar spacer 50-1 in the peripheral edge part 60 is approximately 80% of the disposition density of the columnar spacer 50-1 in the central part 70.

Figure 4:
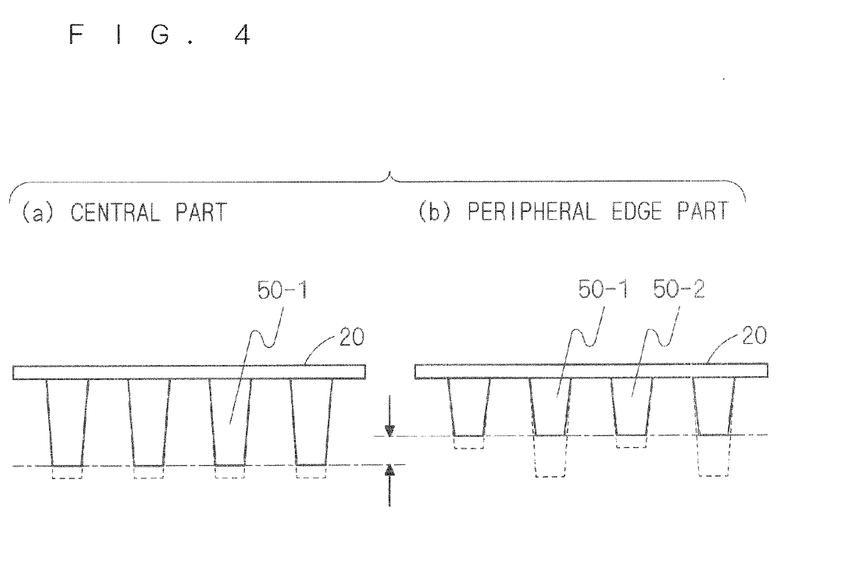
FIG. 4 is a sectional view showing each columnar spacer after the two substrates are disposed opposite to each other according to the first preferred embodiment.

FIG. 4 is a sectional view showing each columnar spacer after the substrate 20 is disposed opposite to the substrate 10 according to the first preferred embodiment. In other words, FIG. 4 is a sectional view showing each columnar spacer in a state in which the liquid crystal display panel 100 is formed. Part (a) in FIG. 4 is a sectional view showing each columnar spacer of the central part 70. Part (b) in FIG. 4 is a sectional view showing each columnar spacer of the peripheral edge part 60.

A portion shown in a dotted line in a tip part of each columnar spacer in FIG. 4 indicates a tip portion of each columnar spacer before the substrate 20 is disposed opposite to the substrate 10 as illustrated in FIG. 3, that is, each columnar spacer in the non-pressure state, and is indicated as a standard of a compression amount of each columnar spacer.

As shown in FIG. 4, in the state in which the liquid crystal display panel 100 is formed, the disposition density of the columnar spacer 50-1 in the peripheral edge part 60 is lower than that of the columnar spacer 50-1 in the central part 70. The central part 70 has the main PS structure. In other words, the central part 70 includes only the columnar spacer 50-1 having an equal height in the non-pressure state. Consequently, the central part 70 has a sufficient strength.

From the foregoing, the columnar spacer 50-1 of the peripheral edge part 60 is deformed (compressed) in a vertical direction more greatly than the columnar spacer 50-1 of the central part 70 in the formation of the gap (the liquid crystal display panel 100). In the following, a variation in the heights of the columnar spacer 50-1 in the non-pressure state and the columnar spacer 50-1 compressed by receiving a pressure in the vertical direction will be represented as ΔPS.

In FIG. 4, it is also possible to suppose that a distance between the tip of the columnar spacer 50-1 shown in a solid line and the tip of the columnar spacer 50-1 in the non-pressure state shown in a dotted line corresponds to ΔPS. In the formation of the gap (the liquid crystal display panel 100) generating ΔPS, the pressure in the vertical direction which is received by the columnar spacer 50-1 is roughly equivalent to an atmospheric pressure applied to the surface of the liquid crystal display panel 100. Repulsive force generated by the compression of each columnar spacer and a pressure of the liquid crystal layer, and furthermore, a residual stress between the substrates 20 and 10 in the liquid crystal cell and the like are balanced with the atmospheric pressure. Consequently, ΔPS and the gap of the liquid crystal display panel 100 are determined.

Moreover, according to the present preferred embodiment, the columnar spacer 50-1 is deformed greatly in the peripheral edge part 60 in which a gravity irregularity tends to occur. In other words, ΔPS is great. For this reason, even if the liquid crystal layer 30 expands in the deformation amount of the columnar spacer 50-1 or more in the formation of the gap in the central part 70, it is possible to absorb the expansion of the liquid crystal layer 30 in the peripheral edge part 60.

Moreover, in the central part 70, it is preferable that the columnar spacer 50-1 should follow the contraction of the liquid crystal layer 30 at a low temperature. Therefore, it is possible to dispose the columnar spacer 50-1 in the central part 70 at a comparatively high density. By the structure, it is possible to increase a strength (a panel strength) of the central part 70.

In the present embodiment, the disposition density of the columnar spacer 50-1 in the peripheral edge part 60 is lower than that of the columnar spacer 50-1 in the central part 70. For this reason, if only the columnar spacer 50-1 is disposed in the peripheral edge part 60, that is, the disposition of the columnar spacer 50-2 is omitted from the structure shown in the part (b) in FIG. 4, the columnar spacer 50-1 is apt to be deformed so that ΔPS can be increased but the gap tends to be thinned unnecessarily.

However, in the present preferred embodiment, the columnar spacer 50-2 is disposed in addition to the columnar spacer 50-1 in the peripheral edge part 60. In other words, the peripheral edge part 60 has the dual PS structure. By the structure, as shown in the part (b) in FIG. 4, the gap of the peripheral edge part 60 is defined to slightly deform the columnar spacer 50-2, that is, to be slightly smaller than the height of the columnar spacer 50-2. As a result, it is possible to increase ΔPS and to prevent the gap from being extremely thinned in the peripheral edge part 60. In other words, it is possible to suppress a change in the gap of the peripheral edge part 60. As a result, it is possible to prevent the occurrence of the gap irregularity.

In other words, in the present preferred embodiment, it is possible to prevent the change in the gap of the peripheral edge part 60 in the display region 80 while maintaining the strength of the central part 70 in the display region 80.

In the liquid crystal display panel according to the related art, the columnar spacer 50-1 and the columnar spacer 50-2 are similarly disposed in the peripheral edge part and the central part of the display region. In the liquid crystal display panel according to the related art, therefore, it is necessary to deal with a gravity irregularity occurring in the peripheral edge part by the expansion of the liquid crystal layer at a high temperature foaming generated in the peripheral edge part and the central part by the contraction of the liquid crystal layer at a low temperature. For this reason, it is also necessary to increase ΔPS, thereby reducing the disposition density of the columnar spacer 50-1 in the central part. As a result, in the liquid crystal display panel according to the related art, it is impossible to ensure a sufficient strength (surface pressing strength) in the central part.

On the other hand, in the present preferred embodiment, it is possible to sufficiently ensure the strength of the central part 70 in the display region 80 by the structure described above.

In general, it is necessary to increase the difference between the heights of the high columnar spacer and the low columnar spacer in order to obtain a design having a large process margin in which the columnar spacer tends to be deformed elastically and the height of the columnar spacer can easily be balanced with the amount of the liquid crystal layer.

However, it is impossible to cause the high columnar spacer to apply weighting to the low spacer within the elastic deformation range by simply increasing the difference between the heights of the columnar spacers. For this reason, in the related art, there is a problem in that a process margin and a panel strength cannot be compatible with each other.

Therefore, in the present preferred embodiment, there is employed the structure in which the central part 70 has the main PS structure and the peripheral edge part 60 has the dual PS structure as described above. By the structure, it is possible to cause a sufficient process margin and a panel strength to be compatible with each other.

Moreover, according to the present preferred embodiment, it is possible to prevent an irregularity from being caused by the expansion of the liquid crystal of the liquid crystal layer at a high temperature and prevent the flow-down of the liquid crystal due to a gravity or air bubbles from being generated by the contraction of the liquid crystal at a low temperature. Furthermore, also in the case in which the weighting is applied to the liquid crystal display panel 100, it is possible to ensure the panel strength, thereby suppressing the occurrence of the gap irregularity.

Second Preferred Embodiment

The liquid crystal display 1000 according to the first preferred embodiment is employed for a liquid crystal display according to the present preferred embodiment. Therefore, the detailed description of the liquid crystal display 1000 will not be repeated. In the present preferred embodiment, the disposition and structure of a columnar spacer is different from that of the first preferred embodiment.

Figure 5:
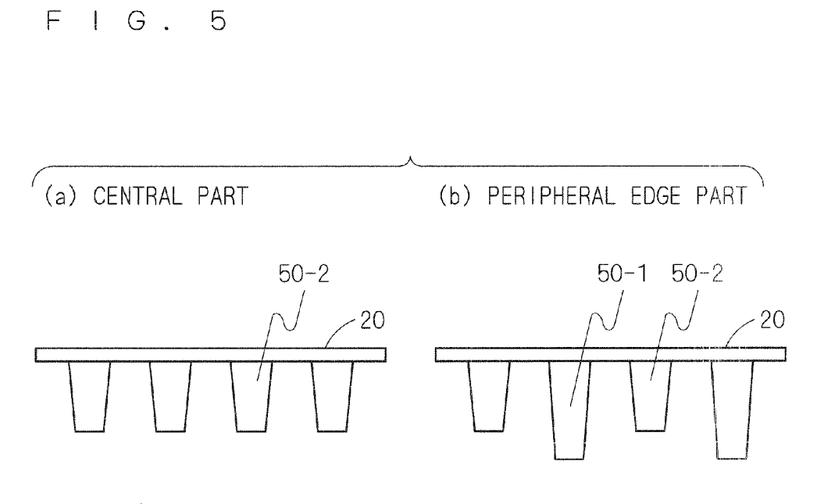
FIG. 5 is a sectional view showing each columnar spacer before two substrates are disposed opposite to each other according to a second preferred embodiment.

FIG. 5 is a sectional view showing each columnar spacer before a substrate 20 is disposed opposite to a substrate 10 according to a second preferred embodiment. More specifically, FIG. 5 is a sectional view showing each columnar spacer in the middle of manufacture of a liquid crystal display panel 100. Part (a) in FIG. 5 is a sectional view showing each columnar spacer of a central part 70. Part (b) in FIG. 5 is a sectional view showing each columnar spacer of a peripheral edge part 60.

Figure 6:
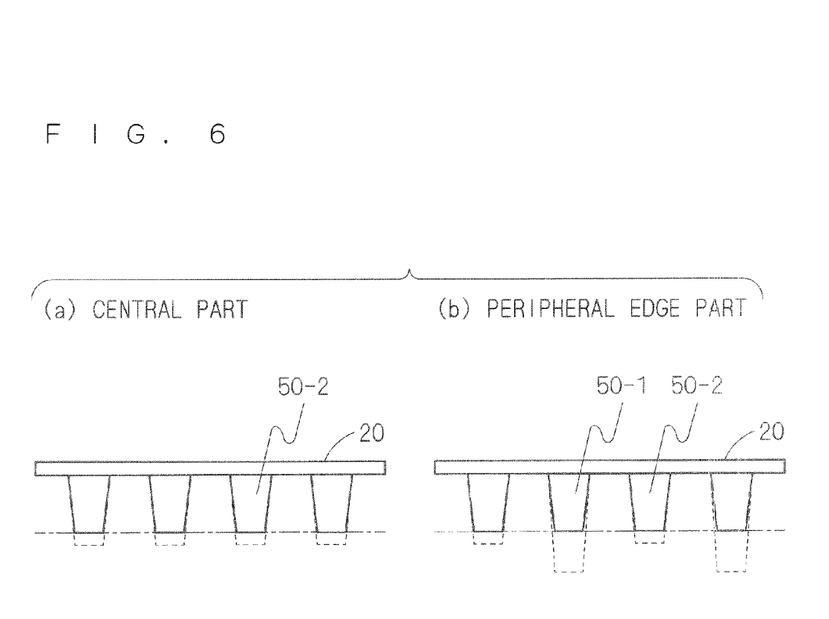
FIG. 6 is a sectional view showing each columnar spacer after the two substrates are disposed opposite to each other according to the second preferred embodiment.

FIG. 6 is a sectional view showing each columnar spacer after the substrate 20 is disposed opposite to the substrate 10 according to the second preferred embodiment. More specifically, FIG. 6 is a sectional view showing each columnar spacer in a state in which the liquid crystal display panel 100 is formed. Part (a) in FIG. 6 is a sectional view showing each columnar spacer of the central part 70. Part (b) in FIG. 6 is a sectional view showing each columnar spacer of the peripheral edge part 60.

The second preferred embodiment has a characteristic that only a columnar spacer 50-2 is disposed in the central part 70. In the following, a structure in which only the columnar spacer 50-2 is disposed will also be referred to as a sub PS structure. In other words, the central part 70 has the sub PS structure in which only the columnar spacer 50-2 is disposed in the central part 70. More specifically, the central part 70 includes only the columnar spacer 50-2 in which a height is equal in a non-pressure state. Consequently, the central part 70 has a sufficient strength. The peripheral edge part 60 has a dual PS structure in the same manner as in the first preferred embodiment.

By the structure described above, in the same manner as in the first preferred embodiment, a difference between the heights of the columnar spacer 50-1 in the non-pressure state and the columnar spacer 50-2 in the non-pressure state (a concave-convex difference in the columnar spacer) is greater in the peripheral edge part 60 than the central part 70. In the present preferred embodiment, only the columnar spacer 50-2 is disposed in the central part 70. Therefore, the concavo-convex difference in the columnar spacer of the central part 70 is zero.

In the peripheral edge part 60 in which a gravity irregularity tends to occur, the columnar spacer 50-1 is deformed (compressed) in a vertical direction. Consequently, it is possible to absorb the expansion of the liquid crystal layer 30. It is preferable that the columnar spacer 50-2 should follow only in the contraction of the liquid crystal layer 30 at a low temperature. Therefore, the columnar spacer 50-2 can be disposed at a comparatively high density in the central part 70. It is possible to increase a strength (a panel strength) of the central part 70.

Furthermore, according to the present preferred embodiment, a gap (a panel gap) is defined by the columnar spacer 50-2 in both the peripheral edge part 60 and the central part 70. As a result, it is easy to uniformly form the gap.

Third Preferred Embodiment

The liquid crystal display 1000 according to the first preferred embodiment is employed for a liquid crystal display according to the present preferred embodiment. Therefore, the detailed description of the liquid crystal display 1000 will not be repeated.

Figure 7:
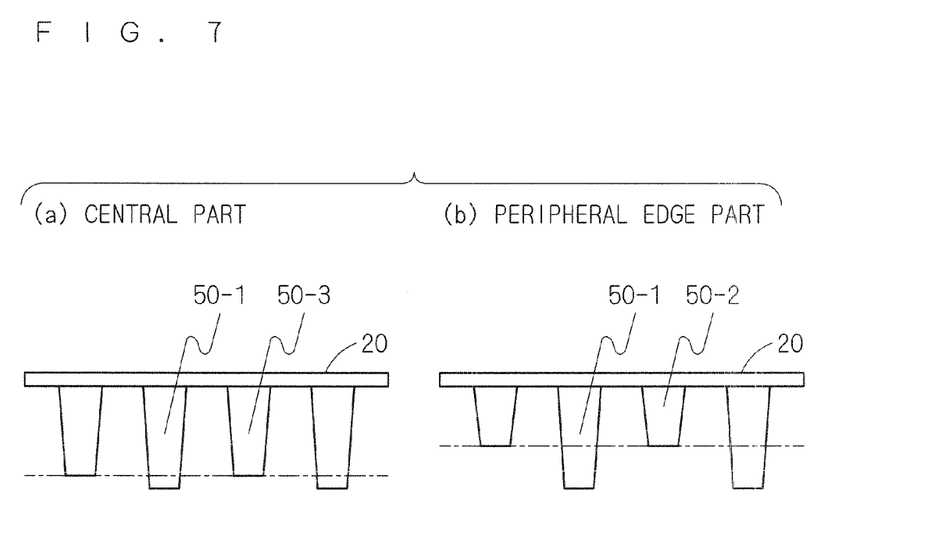
FIG. 7 is a sectional view showing each columnar spacer before two substrates are disposed opposite to each other according to a third preferred embodiment.

FIG. 7 is a sectional view showing each columnar spacer before a substrate 20 is disposed opposite to a substrate 10 according to a third preferred embodiment. More specifically, FIG. 7 is a sectional view showing each columnar spacer in the middle of manufacture of a liquid crystal display panel 100. Part (a) in FIG. 7 is a sectional view showing each columnar spacer of a central part 70. Part (b) in FIG. 7 is a sectional view showing each columnar spacer of a peripheral edge part 60.

Figure 8:
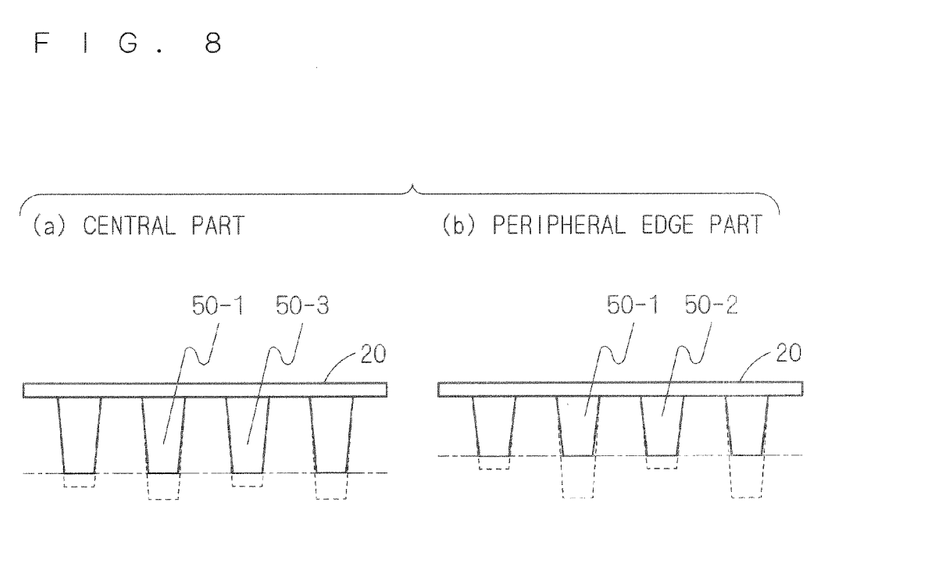
FIG. 8 is a sectional view showing each columnar spacer after the two substrates are disposed opposite to each other according to the third preferred embodiment.

FIG. 8 is a sectional view showing each columnar spacer after the substrate 20 is disposed opposite to the substrate 10 according to the third preferred embodiment. More specifically, FIG. 8 is a sectional views showing each columnar spacer in a state in which the liquid crystal display panel 100 is formed. Part (a) in FIG. 8 is a sectional view showing each columnar spacer of the central part 70. Part (b) in FIG. 8 is a sectional view showing each columnar spacer of the peripheral edge part 60.

In the present preferred embodiment, the peripheral edge part 60 has a dual PS structure in the same manner as in the first preferred embodiment. In other words, a columnar spacer 50-1 and a columnar spacer 50-2 are disposed in the peripheral edge part 60.

Moreover, the columnar spacer 50-1 and a columnar spacer 50-3 are disposed in the central part 70. The columnar spacer 50-3 is constituted by the same material as the columnar spacer 50-1. The columnar spacer 50-3 has elasticity.

A height of the columnar spacer 50-3 in a non-pressure state is smaller than that of the columnar spacer 50-1 in the non-pressure state. A difference between the columnar spacer 50-1 and the columnar spacer 50-3 is equal to or greater than 0.3 μm, for example. Moreover, the height of the columnar spacer 50-3 in the non-pressure state is greater than that of the columnar spacer 50-2 in the non-pressure state. In other words, the central part 70 has the dual PS structure. In the following, the columnar spacer 50-3 will also be represented as a columnar spacer 50.

Moreover, in the present preferred embodiment, a disposition density of the columnar spacer 50-1 is higher in the central part 70 than the peripheral edge part 60. In other words, the disposition density of the columnar spacer 50-1 in the central part 70 is higher than that of the columnar spacer 50-1 in the peripheral edge part 60.

According to the structure described above, the columnar spacer 50-1 is greatly deformed (compressed) in a vertical direction in the peripheral edge part 60, and furthermore, the columnar spacer 50-1 is deformed in the vertical direction also in the central part 70. More specifically, in the present preferred embodiment, there is satisfied a relational expression of ΔPS of the columnar spacer 50-1 in the central part 70<ΔPS of the columnar spacer 50-1 in the peripheral edge part 60. For this reason, it is possible to absorb the expansion of a liquid crystal layer 30 in the central part 70. Therefore, according to the present preferred embodiment, it is easy to follow by the expansion of the liquid crystal layer 30.

By the structure described above, the concavo-convex difference in the columnar spacer is greater in the peripheral edge part 60 than the central part 70 in the same manner as in the first preferred embodiment.

The columnar spacer 50-2 and the columnar spacer 50-3 are formed with a transmittance of a photomask varied. Accordingly, it is possible to form columnar spacers having heights different from each other without considerably increasing a manufacturing cost in the same manner as in the first preferred embodiment. However, in the case in which the photomask for controlling the transmittance is formed by a half tone method, an opening portion is formed on a metal mask and a semitransparent film is provided in the opening portion, and a creating process in the preparation of the photomask is increased. Moreover, in the case in which the formation is carried out by a gray tone method, it is necessary to use a slitting process having a high resolution though a density of a slit is varied so that a process for preparing the photomask is not increased. In any case, a cost for preparing the photomask is increased slightly.

Alternatively, the columnar spacer 50-2 and the columnar spacer 50-3 may be formed by causing the transmittance of the photomask to be equal and varying a diameter and a shape of a plane pattern of the columnar spacer. In the case in which the shape of the columnar spacer is varied, it is preferable to select two different types of shapes from a circular shape, an elliptical shape, a square shape and the like, for example.

The height of the columnar spacer is influenced by the diameter or shape of the columnar spacer via a columnar spacer processing step such as a developing process or a baking process particularly when the plane pattern of the columnar spacer is comparatively small. In other words, it is possible to form columnar spacers having different heights by utilizing the action to change the diameter or shape of the plane pattern of the columnar spacer into two different types. In the case in which the method is used, the preparation of the photomask does not require a special cost and it is possible to form the columnar spacers having different heights with slight complication of design of the columnar spacer.

Fourth Preferred Embodiment

The liquid crystal display 1000 according to the first preferred embodiment is employed for a liquid crystal display according to the present preferred embodiment. Therefore, the detailed description of the liquid crystal display 1000 will not be repeated.

Figure 9:
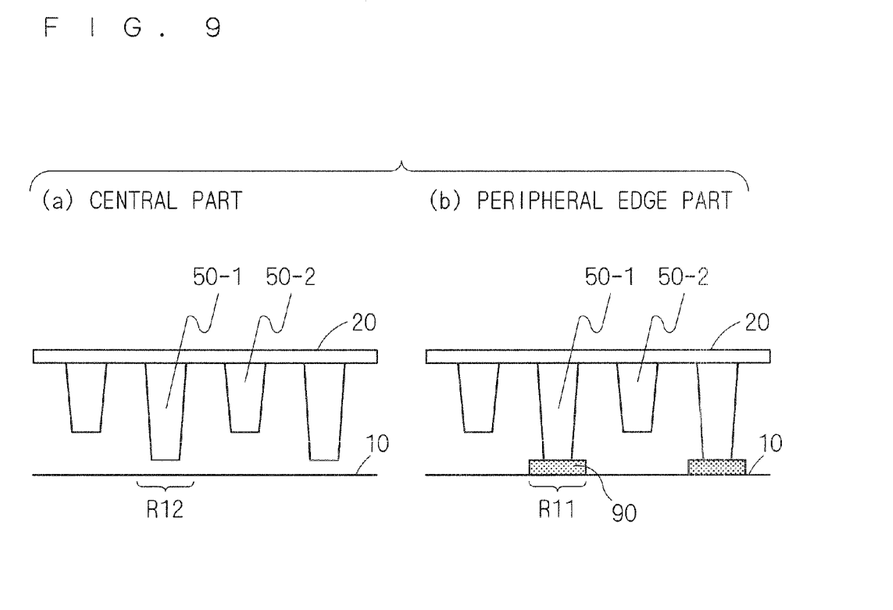
FIG. 9 is a sectional view showing each columnar spacer before two substrates are disposed opposite to each other according to a fourth preferred embodiment.

FIG. 9 is a sectional view showing each columnar spacer before a substrate 20 is disposed opposite to a substrate 10 according to a fourth preferred embodiment. More specifically, FIG. 9 is a sectional view showing each columnar spacer in the middle of manufacture of the liquid crystal display panel 100. Part (a) in FIG. 9 is a sectional view showing each columnar spacer of a central part 70. Part (b) in FIG. 9 is a sectional view showing each columnar spacer of a peripheral edge part 60.

Figure 10:
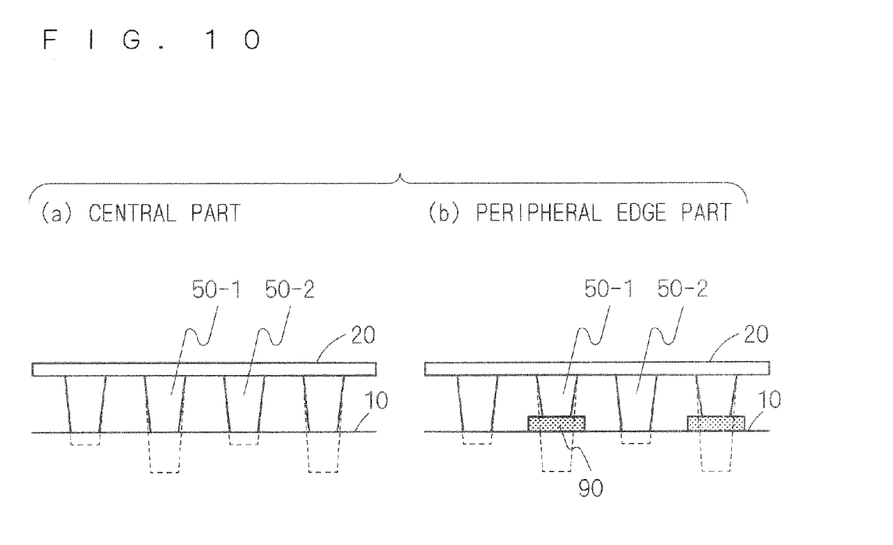
FIG. 10 is a sectional view showing each columnar spacer after the two substrates are disposed opposite to each other according to the fourth preferred embodiment.

FIG. 10 is a sectional view showing each columnar spacer after the substrate 20 is disposed opposite to the substrate 10 according to the fourth preferred embodiment. More specifically, FIG. 10 is a sectional view showing each columnar spacer in a state in which the liquid crystal display panel 100 is formed. Part (a) in FIG. 10 is a sectional view showing each columnar spacer of the central part 70. Part (b) in FIG. 10 is a sectional view showing each columnar spacer of the peripheral edge part 60.

In the present preferred embodiment, a columnar spacer 50-1 and a columnar spacer 50-2 are formed on the substrate 20 (a color filter substrate). In the present preferred embodiment, each of the central part 70 and the peripheral edge part 60 has a dual PS structure.

The substrate 10 includes a region R11 and a region R12. The region R11 is opposed to the columnar spacer 50-1 in the peripheral edge part 60. The region R12 is opposed to the columnar spacer 50-1 in the central part 70.

A higher step film 90 than a surface of the region R12 is provided in the region R11 of the substrate 10. More specifically, the step film 90 is formed in an opposed portion (region) to the columnar spacer 50-1 in the peripheral edge part 60 of the substrate 10. Consequently, an effective PS step (a difference in the columnar spacer) in the peripheral edge part 60 is increased.

As described above, it is necessary to vary the transmittance of the photomask or to change the diameter or shape of the plane pattern of the columnar spacer in order to vary the heights of the columnar spacers 50-1 and 50-2. However, the cost is slightly increased or the design is complicated. Moreover, in the case in which the heights of the columnar spacers 50-1 and 50-2 are varied, there is a possibility that a variation in the height might be increased.

In the present preferred embodiment, the mask design of the substrate 20 (the color filter substrate) becomes uniform by the utilization of the step of the substrate 10 (an array side). As a result, it is possible to enhance controllability of the effective PS step in the peripheral edge part 60.

The step film 90 is any of a scanning line, a common wiring, a signal line, a semiconductor layer and an insulating film which constitute a TFT substrate. The step film 90 may be formed by properly selecting any of the scanning line, the common wiring, the signal line, the semiconductor layer and the insulating film depending on a necessary step and then laminating the selected ones.

Fifth Preferred Embodiment

The liquid crystal display 1000 according to the first preferred embodiment is employed for a liquid crystal display according to the present preferred embodiment. Therefore, the detailed description of the liquid crystal display 1000 will not be repeated.

Figure 11:
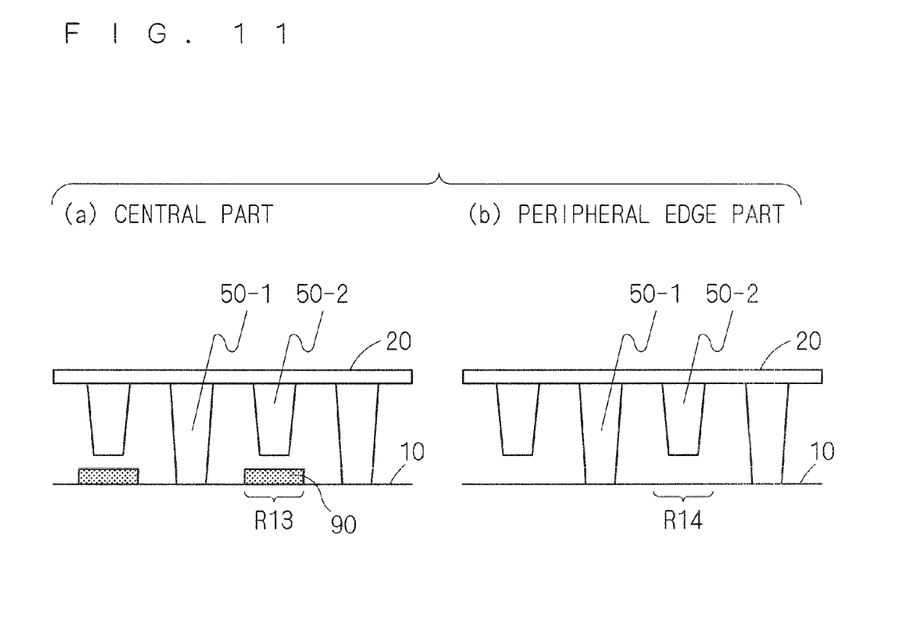
FIG. 11 is a sectional view showing each columnar spacer before two substrates are disposed opposite to each other according to a fifth preferred embodiment.

FIG. 11 is a sectional view showing each columnar spacer before a substrate 20 is disposed opposite to a substrate 10 according to a fifth preferred embodiment. More specifically, FIG. 11 is a sectional view showing each columnar spacer in the middle of manufacture of the liquid crystal display panel 100. Part (a) in FIG. 11 is a sectional view showing each columnar spacer of a central part 70. Part (b) in FIG. 11 is a sectional view showing each columnar spacer of a peripheral edge part 60.

Figure 12:
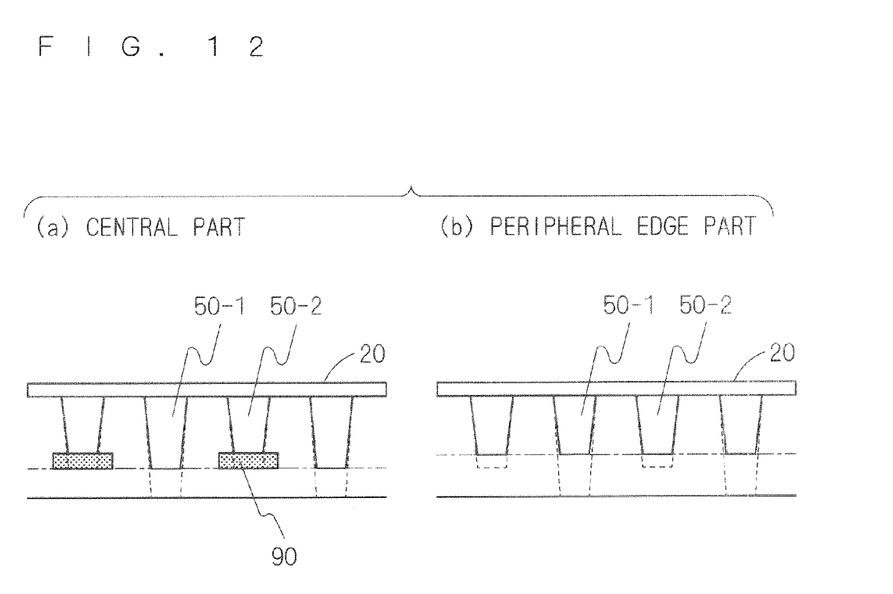
FIG. 12 is a sectional view showing each columnar spacer after the two substrates are disposed opposite to each other according to the fifth preferred embodiment.

FIG. 12 is a sectional view showing each columnar spacer after the substrate 20 is disposed opposite to the substrate 10 according to the fifth preferred embodiment. More specifically, FIG. 12 is a sectional view showing each columnar spacer in a state in which the liquid crystal display panel 100 is formed. Part (a) in FIG. 12 is a sectional view showing each columnar spacer of the central part 70. Part (b) in FIG. 12 is a sectional view showing each columnar spacer of the peripheral edge part 60.

In the present preferred embodiment, a columnar spacer 50-1 and a columnar spacer 50-2 are formed on the substrate 20 (a color filter substrate) in the same manner as in the fourth preferred embodiment. In the present preferred embodiment, each of the central part 70 and the peripheral edge part 60 has a dual PS structure in the same manner as in the fourth preferred embodiment.

The substrate 10 includes a region R13 and a region R14. The region R13 is opposed to the columnar spacer 50-2 in the central part 70. The region R14 is opposed to the columnar spacer 50-2 in the peripheral edge part 60.

A higher step film 90 than a surface of the region R14 is provided in the region R13 of the substrate 10. More specifically, the step film 90 is formed in an opposed portion (region) to the columnar spacer 50-2 in the central part 70 of the substrate 10. Consequently, an effective PS step (a difference in the columnar spacer) in the central part 70 is reduced. The step film 90 according to the present preferred embodiment has the same structure as that of the step film 90 according to the fourth preferred embodiment.

Sixth Preferred Embodiment

In the present preferred embodiment, each columnar spacer 50-1 is disposed in such a manner that the disposition density of the columnar spacer 50-1 is gradually (stepwise) reduced from the central part 70 toward the peripheral edge part 60 in any of the structures according to the first to fifth preferred embodiments.

By the structure described above, a gap can be changed gently from the central part 70 to the peripheral edge part 60. Accordingly, a gap irregularity can be caused to occur with difficulty.

Seventh Preferred Embodiment

In the present preferred embodiment, each columnar spacer 50-1 and each columnar spacer 50-2 are constituted in such a manner that the difference between the heights of the columnar spacer 50-1 in the non-pressure state and the columnar spacer 50-2 in the non-pressure state is gradually (stepwise) increased from the central part 70 toward the peripheral edge part 60 in any of the structures according to the first to fifth preferred embodiments.

By the structure described above, a gap can be changed gently from the central part 70 to the peripheral edge part 60. Accordingly, a gap irregularity can be caused to occur with difficulty.

In the first to seventh preferred embodiments, there has not been mentioned the hold of the substrate in relation to a region between the sealing material 40 and the display region 80 (which will be hereinafter referred to as a frame region). However, in the case in which the frame region is rather large, a holding state in the frame region also influences the occurrence of the gap irregularity. Basically, it is desirable that a disposition in the frame region should be the same as the disposition of the columnar spacer 50 in the peripheral edge part 60 of the display region 80.

In other words, it is desirable that the columnar spacer 50-1 and the columnar spacer 50-2 should be mixed and disposed to the same degree in the frame region. However, in the frame region, there is a comparatively small necessity for disposing the columnar spacer 50-2 contributing to the hold of the substrate in the case in which external force is applied. Therefore, in the frame region, it is also possible to employ a structure in which the columnar spacer 50-2 is omitted and only the columnar spacer 50-1 is disposed at an almost equal disposition density to that of the peripheral edge part 60. With the structure, similarly, almost the same advantages can be obtained.

In the frame region, it is also possible to change the structure of the columnar spacer 50-1 or the columnar spacer 50-2 from the central part 70 toward the peripheral edge part 60 in the display region 80 in the same manner as in the sixth preferred embodiment or the seventh preferred embodiment. In other words, referring to the columnar spacer 50-1 or the columnar spacer 50-2 which is to be disposed in the frame region, it is also possible to reduce the disposition density of the columnar spacer 50-1 more greatly as compared with the peripheral edge part 60 in the display region 80. Moreover, in the frame region, it is also possible to increase the difference between the heights of the columnar spacer 50-1 and the columnar spacer 50-2. Consequently, it is possible to obtain the same function and effect as in the sixth preferred embodiment or the seventh preferred embodiment.

In the present invention, the respective preferred embodiments can be combined freely or can be changed or omitted properly within the range of the invention.

The present invention can be utilized as a liquid crystal display capable of suppressing a change in a gap of a peripheral edge part in a display region while maintaining a strength of a central part of the display region.

While the invention has been shown and described in detail, the foregoing description is in all aspects illustrative and not restrictive. It is therefore understood that numerous modifications and variations can be devised without departing from the scope of the invention.

What is claimed is:

1. A liquid crystal display comprising:
a liquid crystal display panel for displaying a video,
said liquid crystal display panel including:

a first substrate and a second substrate which are disposed opposite to each other;

a plurality of columnar spacers disposed on a surface of said first substrate and providing a gap between said first substrate and said second substrate; and a liquid crystal layer filled between said first substrate and said second substrate, wherein said plurality of columnar spacers include at least one first columnar spacer and at least one second columnar spacer, a height of said first columnar spacer in a non-pressure state in which a pressure is not received in a vertical direction is greater than that of said second columnar spacer in said non-pressure state, a peripheral edge part of a display region has a dual PS structure in which said first columnar spacer and said second columnar spacer are disposed, a central part of said display region has said dual PS structure, and in the case in which said central part has said dual PS structure and a variation in a height between said first columnar spacer in said non-pressure state and said first columnar spacer compressed upon receipt of a pressure in a vertical direction is represented by ΔPS, there is satisfied a relational expression of ΔPS of said first columnar spacer in said central part <ΔPS of said first columnar spacer in said peripheral edge part; wherein said plurality of first columnar spacers and second columnar spacers are disposed in each of said central part and said peripheral edge part, a disposition density to be a rate of a total sum of areas in which said first columnar spacer is provided in contact with said first substrate in a unit area to said unit area is higher in said central part than said peripheral edge part, and a difference between heights of said first columnar spacer in said non-pressure state and said second columnar spacer in said non-pressure state is greater in said peripheral edge part than said central part.

2. The liquid crystal display according to claim 1, wherein said each of first columnar spacers and said each of second columnar spacers are constituted in such a manner that said difference between said heights is gradually increased from said central part toward said peripheral edge part.

3. A liquid crystal display comprising:

a liquid crystal display panel for displaying a video, said liquid crystal display panel including:

a first substrate and a second substrate which are disposed opposite to each other;

a plurality of columnar spacers disposed on a surface of said first substrate and providing a gap between said first substrate and said second substrate; and a liquid crystal layer filled between said first substrate and said second substrate, wherein said plurality of columnar spacers include at least one first columnar spacer and at least one second columnar spacer, a height of said first columnar spacer in a non-pressure state in which a pressure is not received in a vertical direction is greater than that of said second columnar spacer in said non-pressure state, a peripheral edge part of a display region has a dual PS structure in which said first columnar spacer and said second columnar spacer are disposed, a central part of said display region has said dual PS structure, and in the case in which said central part has said dual PS structure and a variation in a height between said first columnar spacer in said non-pressure state and said first columnar spacer compressed upon receipt of a pressure in a vertical direction is represented by ΔPS, there is satisfied a relational expression of ΔPS of said first columnar spacer in said central part <ΔPS of said first columnar spacer in said peripheral edge part; wherein said plurality of first columnar spacers and second columnar spacers are disposed in each of said central part and said peripheral edge part, a disposition density to be a rate of a total sum of areas in which said first columnar spacer is provided in contact with said first substrate in a unit area to said unit area is higher in said central part than said peripheral edge part;

said second substrate includes a first region to be a region which is opposed to said first columnar spacer in said peripheral edge part, and a second region to be a region which is opposed to said first columnar spacer in said central part, and a step film higher than a surface of said second region is provided in said first region.

4. A liquid crystal display comprising:

a liquid crystal display panel for displaying a video, said liquid crystal display panel including:

a first substrate and a second substrate which are disposed opposite to each other;

a plurality of columnar spacers disposed on a surface of said first substrate and providing a gap between said first substrate and said second substrate; and a liquid crystal layer filled between said first substrate and said second substrate, wherein said plurality of columnar spacers include at least one first columnar spacer and at least one second columnar spacer, a height of said first columnar spacer in a non-pressure state in which a pressure is not received in a vertical direction is greater than that of said second columnar spacer in said non-pressure state, a peripheral edge part of a display region has a dual PS structure in which said first columnar spacer and said second columnar spacer are disposed, a central part of said display region has said dual PS structure, and in the case in which said central part has said dual PS structure and a variation in a height between said first columnar spacer in said non-pressure state and said first columnar spacer compressed upon receipt of a pressure in a vertical direction is represented by ΔPS, there is satisfied a relational expression of ΔPS of said first columnar spacer in said central part <ΔPS of said first columnar spacer in said peripheral edge part; wherein said plurality of first columnar spacers and second columnar spacers are disposed in each of said central part and said peripheral edge part, a disposition density to be a rate of a total sum of areas in which said first columnar spacer is provided in contact with said first substrate in a unit area to said unit area is higher in said central part than said peripheral edge part;

said second substrate includes a third region to be a region which is opposed to said second columnar spacer in said central part, and a fourth region to be a region which is opposed to said second columnar spacer in said peripheral edge part, and a step film higher than a surface of said fourth region is provided in said third region.

\* \* \* \* \*